United States Patent [19]

Chen et al.

[11] Patent Number: 4,717,465

[45] Date of Patent: Jan. 5, 1988

[54] PROCESS FOR PRODUCING JET FUEL WITH ZSM-22 CONTAINING CATALIST

[75] Inventors: Nai Y. Chen, Titusville; William E. Garwood, Haddonfield, both of N.J.

[73] Assignee: Mobil Oil Corporation, New York, N.Y.

[21] Appl. No.: 915,935

[22] Filed: Oct. 6, 1986

Related U.S. Application Data

[63] Continuation of Ser. No. 688,081, Dec. 31, 1984, abandoned.

[51] Int. Cl.$^4$ ............................................. C10G 45/64
[52] U.S. Cl. ..................................... 208/111; 208/15; 208/59
[58] Field of Search ...................... 208/15, 59, 89, 111

[56] References Cited

U.S. PATENT DOCUMENTS

| | | | |
|---|---|---|---|
| 3,015,549 | 1/1962 | Ciapetta et al. | 208/111 |
| 3,539,495 | 11/1970 | Egan | 208/59 |
| 3,617,498 | 11/1971 | Kittrell | 208/80 |
| 3,647,681 | 3/1972 | Egan | |
| 3,876,524 | 4/1975 | White et al. | 208/111 |
| 4,556,477 | 12/1985 | Dwyer | 208/111 |

OTHER PUBLICATIONS

"Alternative Aircraft Fuels", *J. Eng. for Power*, Jan. 1979, vol. 101, pp. 155–160.

*Primary Examiner*—Olik Chaudhuri
*Attorney, Agent, or Firm*—Alexander J. McKillop; Michael G. Gilman; Malcolm D. Keen

[57] ABSTRACT

A novel process is disclosed for the production of high boiling jet fuels which comprises contacting a chargestock with an end boiling point of about 750° F. with ZSM-22 under carefully controlled conditions of temperature and pressure and blending the 330° F. plus fraction with a conventional jet fuel in order to obtain a product having acceptable jet fuel properties and having a high boiling range.

5 Claims, 1 Drawing Figure

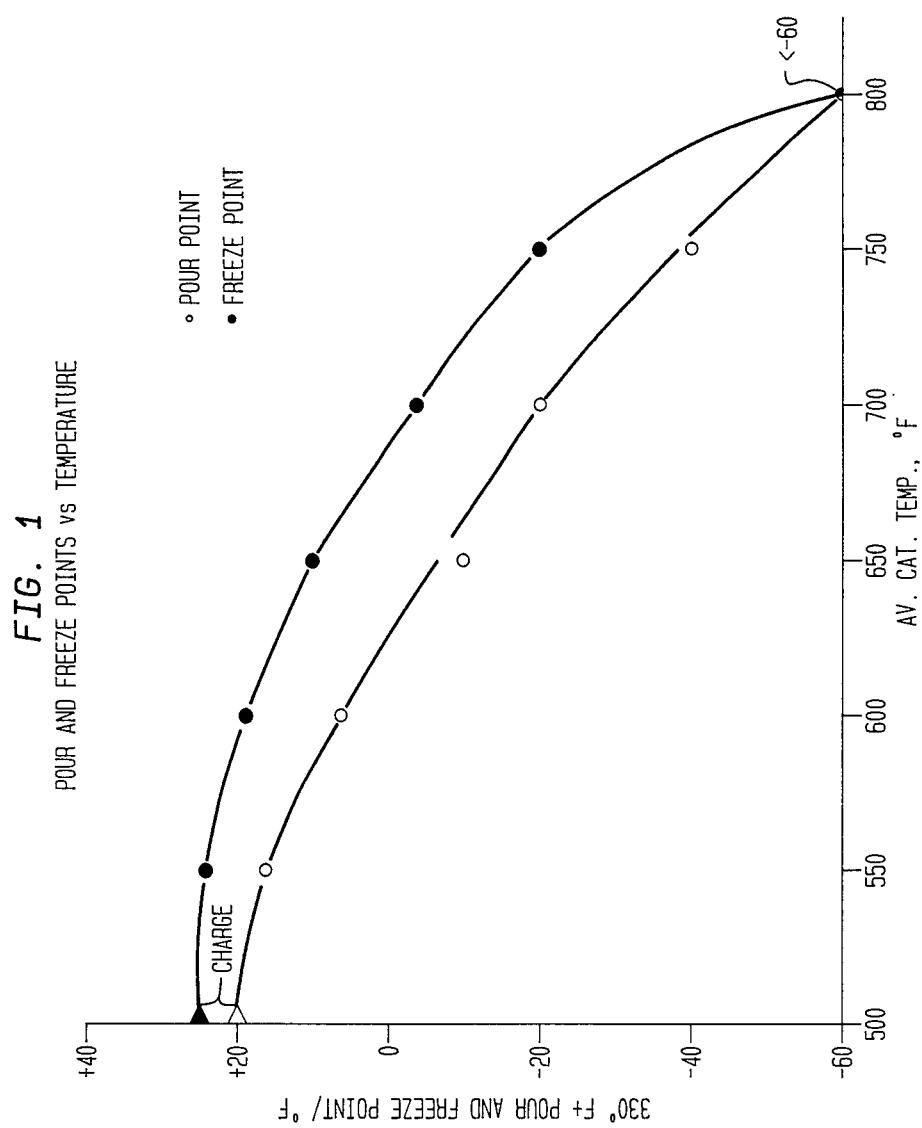

PROCESS FOR PRODUCING JET FUEL WITH ZSM-22 CONTAINING CATALIST

This is a continuation of copending application Ser. No. 688,081, filed on Dec. 31, 1984, now abandoned.

BACKGROUND OF THE INVENTION

Current kerosene-type jet fuels have end points below 650° F., usually below 550° F. due to freeze point limitations. Quite obviously, preparation of a high quality jet fuel which has had its boiling range extended to 750° F. end point increases the availability from a given amount of crude and has tremendous economic potential in view of the world-wide petroleum situation.

DESCRIPTION OF THE PRIOR ART

The preparation of jet fuel by various techniques, including dewaxing is nortoriously old in the art and is, in fact, the subject of technical and patent literature. The concept of catalytic dewaxing with ZSM-5 followed by hydrogenation to produce jet fuel is also broadly old in the art and is, in fact, specifically disclosed in U.S. Pat. No. Re. 28,398, particularly Example 11 thereof. As can be seen, however, Example 11 of said reissue patent is concerned with treatment of a kerosene which has an end point of 500° F. There is no specific disclosure in this patent of extending the process to a boiling range of 750° F.

U.S. Pat. No. 3,647,681 is directed towards a catalytic dewaxing process for the production of jet fuels with mordenite catalysts does disclose extending the boiling range of jet fuel to 650° F. However, said patent does not disclose a method of extending the jet fuel to a boiling range of 750° F., and, in fact, its teachings are diametrically opposed thereto. Thus, said patent teaches at column 3, lines 64 and following the catalytic dewaxing of a 400°-750° F. fraction and then taking only the 300°-650° F. portion of this dewaxed fraction and blending it with conventional jet fuel.

The desirability of extending the end point of jet fuels is recognized in the art as shown in "Journal of Engineering for Power", January 1979, Vol. 101, pages 155–160, even though no specific process is set forth for accomplishing the same. The article does point out at page 156, that extending the boiling range increases the aromatic content and this is undesirable because current specifications limit aromatic content of jet fuel to 25 volume percent maximum.

It has previously been necessary to hydrotreat the dewaxed product in order to lower aromatic content and this adds to the cost of operation.

BRIEF DESCRIPTION OF DRAWING

The FIGURE is a plot of operating temperature vs. pour point and freeze point.

DESCRIPTION OF THE PREFERRED EMBODIMENTS

The novel process of this invention is directed towards a method for producing a high boiling jet fuel which would meet the current specifications and which does not involve a separate hydrogenation step in order to reduce the aromatics content to specification levels. The novel process of this invention involves the catalytic dewaxing of a hydrocarbon feedstock having an end boiling point of about 750° F. by contact of the same under conversion conditions with a crystalline aluminosilicate zeolite identified as ZSM-22 and thereafter blending the product of said dewaxing step with a conventional jet fuel in order to obtain a final product having acceptable jet fuel properties.

As has previously been indicated the concept of dewaxing a petroleum fraction with various zeolites is known in the art. However, it has been found that when ZSM-22 is used under carefully controlled conditions of temperature and pressure, which will be hereinafter defined, that the aromatics content of the chargestock does not substantially increase when dewaxing is carried out in order to lower the pour point and freeze point to acceptable levels. Another benefit of a novel process of this invention is that high yields are obtained. Further, while not wishing to be bound by any theory of operation, nevertheless, it appears that the freeze point lowering which occurs by contacting the chargestock with ZSM-22 is primarily due to hydroisomerization and there is less cracking of branched paraffins as compared to the use of excellent prior art catalysts such as ZSM-5.

Thus, the novel process of this invention represents an improvement over the heretofore known technology in that the use of ZSM-22 allows for the production of a jet fuel in a very good yield without the necessity of carrying out a separate hydrogenation step in order to decrease the aromatics to acceptable levels.

ZSM-22 is a highly siliceous zeolite which can be prepared from a reaction mixture comprising a source of silica, an alkane diamine, an alkali metal oxide or an alkaline earth metal oxide, e.g., sodium, potassium, cesium, calcium, or strontium, water, and alumina, and having a composition, in terms of mole ratios of oxides, falling within the following ratios:

| Reactants | Broad | Preferred | Most Preferred |
|---|---|---|---|
| $SiO_2/Al_2O_3 =$ | 20 to | 30 to 1000 | 60 to 200 |
| $H_2O/SiO_2 =$ | 10 to 100 | 20 to 60 | 20 to 60 |
| $OH^-/SiO_2 =$ | 0 to 0.3 | 0.1 to 0.2 | 0.1 to 0.2 |
| $M^+/SiO_2 =$ | 0 to 2.0 | 0.1 to 1.0 | 0.1 to 1.0 |
| $RN/SiO_2 =$ | 0.01 to 2.0 | 0.05 to 1.0 | 0.05 to 1.0 | wherein RN is a $C_2$–$C_{12}$ alkane diamine of the formula $H_2N$—$(CH_2)_n$—$NH_2$ (abbreviated $C_nDN$), n=2 to 12, and preferably is 5 to 8, and M is an alkali metal or an alkaline earth metal and maintaining the mixture at crystallization temperature until crystals of the ZSM-22 zeolite are formed. Thereafter, the crystals are separated from the liquid by any conventional means, washed and recovered.

Crystallization can be carried out at either static or stirred conditions in a reactor vessel, e.g., a polypropylene jar, teflon lined or stainless steel autoclaves, at 80° C. (176° F.) to about 210° C. (410° F.) for about 6 hours to 150 days. Thereafter, the crystals are separated from the liquid and recovered. The composition can be prepared utilizing materials which supply the appropriate oxide. Such materials include aluminates, alumina, silicates, sodium silicate, silica hydrosol, silica gel, silicic acid, sodium, potassium or cesium hydroxide, and an alkane diamine. Suitable diamines are, e.g., ethanediamine, propanediamine, butanediamine, pentanediamine, hexanediamine, heptanediamine, octane-diamine, nonanediamine, decanediamine, undecanediamine, duodecane-diamine. The reaction mixture can be prepared either batchwise or continuously. Crystal size and crystallization time of the crystalline material varies with the nature of the reaction mixture employed and the crystallization conditions.

As set forth above, the ZSM-22 zeolite can be prepared at a relatively wide range of $SiO_2/Al_2O_3$ ratios of about 20 to about infinity ($\infty$). However, it has been found that larger alkali metal cations, e.g., $K^+$ and $Cs^+$, are preferably used at the $SiO_2/Al_2O_3$ ratios of about 20 to about 90 to obtain ZSM-22 crystals substantially free of impurities or other zeolites. The potassium ($K^+$) cation is preferred at such low $SiO_2/Al_2O_3$ ratios because cesium (Cs) appears to decrease the reaction rate. At the $SiO_2/Al_2O_3$ ratios of 90 or above, e.g., 90 to 200, smaller cations, e.g., sodium ($Na^+$) cations, are preferably used to produce substantially 100% crystalline ZSM-22.

The highly siliceous ZSM-22 zeolite comprises crystalline, three-dimensional continuous framework silicon-containing structures or crystals which result when all the oxygen atoms in the tetrahedra are mutually shared between tetrahedral atoms of ilicon or aluminum, and which can exist with a network of mostly $SiO_2$, i.e., exclusive of any intracrystalline cations. In the as-synthesized form, the ZSM-22 has a calculated composition, in terms of moles or oxides, after dehydration, per 100 moles of silica, as follows:

$$(0.02 \text{ to } 10)RN:(0 \text{ to } 2)M_{2/n}O:(0 \text{ to } 5)Al_2O_3:100SiO_2$$

wherein RN is a $C_2$-$C_{12}$ alkane diamine and M is an alkali metal or an alkaline earth metal having a valence n, e.g., Na, K, Cs, Li, Ca or Sr.

ZSM-22 can further be identified by its sorptive characteristics and its X-ray diffraction pattern. The original cations of the as-synthesized ZSM-22 may be replaced at least in part by other ions using conventional ion exchange techniques. It may be necessary to precalcine the ZSM-22 zeolite crystals prior to ion exchange. The replacing ions introduced to replace the original alkali, alkaline earth and/or organic cations may be any ions that are desired so long as they can pass through the channels within the zeolite crystals. Desired replacing ions are those of hydrogen, rare earth metals, metals of Groups IB, IIA, IIB, IIIA, IIIB, IVA, IVB, VIB and VIII of the Periodic Table. Among the metals, those particularly preferred are rare earth metals, manganese, zinc and those of Group VIII of the Periodic Table.

ZSM-22 zeolite described herein has a definite X-ray diffraction pattern, set forth in Table A, which distinguishes it from other crystalline materials.

TABLE A

| Most Significant Lines of ZSM-22 | | |
|---|---|---|
| Interplanar | d-spacings (Å) | Relative Intensity |
| 10.9 | 0.2 | M-VS |
| 8.7 | 0.16 | W |
| 6.94 | 0.10 | W-M |
| 5.40 | 0.08 | W |
| 4.58 | 0.07 | W |
| 4.36 | 0.07 | VS |
| 3.68 | 0.05 | VS |
| 3.62 | 0.05 | S-VS |
| 3.47 | 0.04 | M-S |
| 3.30 | 0.04 | W |
| 2.74 | 0.02 | W |
| 2.52 | 0.02 | W |

These values were determined by standard techniques. The radiation was the K-alpha doublet of copper and a diffractometer equipped with a scintillation counter and an associated computer were used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstroms (Å), corresponding to the recorded lines, were determined. In Table I, the relative intensities are given in terms of the following symbols vs=very strong, s=strong, m=medium, w=weak, etc. It should be understood that this X-ray diffraction pattern is characteristic of all the species of ZSM-22 zeolite compositions. Ion exchange of the alkali or alkaline earth metal cations with other ions results in a zeolite which reveals substantially the same X-ray diffraction pattern as that of Table I with some minor shifts in interplanar spacing and variations in relative intensity. Other minor variations can occur, depending on the silica to alumina ratio of the particular sample, as well as its degree of thermal treatment.

The ZSM-22 zeolite freely sorbs normal hexane and has a pore dimension greater than about 4 Angstroms. In addition, the structure of the zeolite must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous hydrocarbon conversions, although puckered structures exist such as TMA offretite which is a known effective zeolite. Also, such 12-membered structures can be conceived that may be operative due to pore blockage or other causes.

Rather than attempt to judge from crystal structure whether or not a zeolite possesses the necessary constrained access, a simple determination of the "constraint index" may be made by passing continuously a mixture of an equal weight or normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream or air at 1000° F. for at least 15 minutes. The zeolite is then flushed with helium and the temperature adjusted to between 550° F. (288° C.) and 950° F. (510° C.) to give an overall conversion between 10% and 60%. The mixture of hydrocarbons is passed at a 1 liquid hourly space velocity (LHSV), i.e., 1 volume of liquid hydrocarbon per volume of zeolite per hour, over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

Constraint Index =

-continued $$\frac{\log_{10} \text{(fraction of n-hexane remaining)}}{\log_{10} \text{(fraction of 3-methylpentane remaining)}}$$

The Constraint Index approximates the ratio of the cracking rate constants for the two hydrocarbons. The ZSM-22 zeolite has a Constraint Index of about 7.3 at 800° F. (427° C.). Constraint Index (CI) values for some other typical zeolites are:

| Zeolite | C.I. |
|---|---|
| ZSM-5 | 8.3 |
| ZSM-11 | 8.7 |
| ZSM-12 | 2 |
| ZSM-23 | 9.1 |
| ZSM-38 | 2 |
| ZSM-35 | 4.5 |
| Clinoptilolite | 3.4 |
| TMA Offretite | 3.7 |
| Beta | 0.6 |
| ZSM-4 | 0.5 |
| H-Zeolon | 0.4 |
| REY | 0.4 |
| Amorphous Silica—Alumina (non-zeolite) | 0.6 |
| Erionite | 38 |

It is to be realized that the above Constraint Index values typically characterize the specified zeolites but that these are the cumulative result of several variables used in determination and calculation thereof. Thus, for a given zeolite depending on the temperature employed within the aforenoted range of 550° F. to 950° F., with accompanying conversion between 10% and 60%, the Constraint Index may vary within the indicated approximate range of 1 to 12. Likewise, other variables, such as the crystal size of the zeolite, the presence of possible occluded contaminants and binders intimately combined with the zeolite, may affect the Constraint Index. It will accordingly be understood by those skilled in the art that the Constraint Index, as utilized herein, while affording a highly useful means for characterizing the zeolites of interest is an approximation, taking into consideration the manner of its determinaton, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1000° F. and a liquid hourly space velocity of less than one, such as 0.1 or less, can be employed in order to achieve a minimum total conversion of about 10%.

The sorption of hydrocarbons by ZSM-22 has been surveyed and the results are summarized in Table B. Sorption capacities for n-hexane (normal hexane), cyclohexane, and water are about 4% by weight, or about one third that of ZSM-5. Cyclohexane and o-xylene sorption is relatively slow, making it difficult to determine equilibrium capacities.

TABLE B

ZSM-22 Sorption Data

| Sample | Form | Sorptions (wt percent)[a] | | | |
|---|---|---|---|---|---|
| | | n-hexane | 3-methyl-pentane | Cyclo-hexane | $H_2O$ | o-xylene[b] |
| 1 | Hydrogen | 3.9 | — | 2.8 | — | — |
| 2 | Hydrogen | 4.2 | 3.9 | 1.1 | — | 2 |
| 3 | Hydrogen | 4.1 | — | 3.3 | 4.7 | — |
| 4 | as-synthesized | 3.4 | — | — | — | — |

[a]Hydrocarbons: vapor pressure = 20 mm Hg, temperature = 25° C.; water-pressure = 12 mm Hg, temperature = 25° C.
[b]Vapor pressure = 3.7 mm Hg, temperature = 120° C.
[c]Slow Tailing sorption, nonequilibrium values.

The n-hexane/o-xylene ratios may vary under different conditions, as illustrated by the data of Table C, below:

TABLE C

Adsorption Additional Properties of ZSM-22
Sample Temperature = 100° C.

| Sample | Form | Sorbate | Vapor Pressure (mm Hg) | $P/P_c$ | Wt % sorbed |
|---|---|---|---|---|---|
| 5 | Hydrogen | n-Hexane | 80 | 0.04 | 4.0 |
| 6 | Hydrogen | o-Xylene | 5 | 0.025 | 1.1 |

The ZSM-22 zeolite, as synthesized, tends to crystallize as agglomerates of elongated crystals having the size of about 0.5 to about 2.0 microns. Ballmilling fractures these crystals into smaller size crystallites (about 0.1 microns) without significant loss of crystallinity. The zeolite can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the novel process of this invention, the ZSM-22 zeolite has a hydrogenation metal associated therewith. The hydrogenation metal component, i.e., metal, metal oxide, metal sulfide, is usually one of Group VIIIA of the Periodic Table or a mixture thereof alone or in combination with one or more metal, metal oxide, metal sulfide from Group VIA of the Periodic Table. Examples of metals from Group IIIA are platinum, palladium, irridium, ruthenium, cobalt and nickel. Examples of metals from Group VIA are chromium, molybdenum and tungsten. The hydrogenation metal can vary from about 0.05 to about 2 percent by weight. The most preferred hydrogenation metal is platinum.

The catalytic hydrodewaxing step in accordance with the novel process of this invention is carried out at a very narrow range of temperatures ranging from about 725 to 775—with temperatures hovering around 750° F. being particularly preferred. The hydrogen pressure of the catalytic hydrodewaxing step can vary from about 200 to about 2000 psig, although preferred temperatures are at around 400 psig. The liquid hourly space velocity can range from about 0.2 to about 10.

As will be demonstrated in Examples which follow there is only a very narrow range of operating conditions wherein the novel process of this invention can be carried out. As is heretofore been stated it is the objective to produce a high boiling jet fuel that does not require hydrogenation in order to reduce the aromatic content. In the prior art methods of dewaxing with various other zeolites, such as the excellent catalyst ZSM-5, it has been found that in order to obtain the necessary freeze point, ZSM-5 acted on more of the materials of the chargestock, such as the branched paraffins, thereby resulting in a product which concentrated the aromatics. ZSM-22, on the other hand, can operate more selectively on the chargestock but only in a very narrow range of conditions.

It should be immediately apparent that it is the function of dewaxing to lower the freeze point and, if, indeed, such is not drastically lowered, then the process cannot produce a material suitable as a potential jet fuel. It has been found that temperatures below 725° F. simply do not reduce the pour point sufficient enough to obtan a product which can be blended. On the other hand, temperatures in excess of 775° F. result in a product which too high a concentration of aromatics as well as naphthenes drastic yield losses.

The following Examples will illustrate the novel process of this invention.

F. and then reduced with hydrogen in-situ at 900° F. for one hour at 1 LHSV, 400 psig, 2500 SCF hydrogen/Hr over a temperature range of 500° to 800° F. The Arab light gas oil had the following properties:

| | |
|---|---|
| Gravity, °API | 37.2 |
| Specific | 0.8388 |
| Pour Point, °F. | +20 |
| Freeze Point, °F. | +25 |
| Hydrogen, wt percent | 13.42 |
| Sulfur, wt percent | 1.01 |
| Aromatics, vol percent | 31.1 |
| Naphthalenes, vol percent | 8.5 |
| Smoke Point | 19.2 |
| Boiling Range, °F. | |
| 1 percent | 263 |
| 2 percent | 316 |
| 5 percent | 381 |
| 10 percent | 426 |
| 30 percent | 506 |
| 50 percent | 559 |
| 70 percent | 608 |
| 90 percent | 675 |
| 95 percent | 703 |
| 98 percent | 731 |

The dewaxing was carried out at various temperatures and the results are shown in the following table.

TABLE 1

Run Data
Charge Light Arab Gas Oil, Catalyst 0.57 wt % Pt/ZSM-22 Extrudate
400 psig, 1 LHSV, 2500 SCF H$_2$/bbl

| Examples | CHARGE | 1 | 2 | 3 | 4 | 5 | 6 | 7 |
|---|---|---|---|---|---|---|---|---|
| Av. Cat. Temp., °F. | | 501 | 550 | 599 | 650 | 700 | 751 | 800 |
| Mat. Bal., hours | | 21.5 | 22 | 21 | 22 | 22 | 22 | 22 |
| TOS, days | | 8.3(2) | 9.2 | 10.1 | 11.0 | 11.9 | 12.8 | 13.7 |
| Liquid Product, wt % H | 13.42 | 13.61 | 13.58 | 13.72 | 13.84 | 13.68 | 13.61 | 13.25 |
| Pour Point, °F. (Lab) | +20 | +2 | +15 | +10 | −5 | −15 | −30 | <−60 |
| Mat. Bal., wt % | | 99.6 | 99.9 | 98.9 | 98.4 | 99.8 | 98.8 | 99.2 |
| Yields, wt % (NLB) | | | | | | | | |
| C$_1$ + C$_2$ | | <0.1 | 0.1 | 0.4 | 0.8 | 0.5 | 0.4 | 0.6 |
| C$_3$ | | 0.1 | 0.3 | 0.7 | 1.4 | 1.2 | 1.1 | 2.1 |
| C$_4$ | | 0.1 | 0.2 | <0.1 | 0.1 | 0.5 | 0.5 | 1.5 |
| C$_5$ | | <0.1 | <0.1 | <0.1 | <0.1 | <0.1 | <0.1 | 1.5 |
| C$_6$-330° F. | | | <0.1 | <0.1 | <0.1 | <0.1 | <0.1 | 9.9 |
| 330° F.+ | 100 | 99.8 | 99.4 | 99.0 | 97.8 | 97.3 | 97.2 | 83.4 |
| H$_2$ Consumption, SCF/bbl | | 120 | 110 | 215 | 330 | 205 | 140 | −25 |
| 330° F.+ Properties | | | | | | | | |
| Gravity, °API | 37.2 | 36.6 | 37.6 | 37.7 | 37.9 | 38.5 | 39.0 | 36.8 |
| Specific | 0.8388 | 0.8418 | 0.8368 | 0.8363 | 0.8353 | 0.8324 | 0.8299 | 0.8408 |
| Pour Point, °F. (D-97) | +20 | +20 | +15 | +5 | −10 | −20 | −40 | <−60 |
| Freeze Point, °F. | +25 | — | +23 | +18 | +10 | −4 | −20 | <−60(3) |
| Sulfur, wt % | 1.01 | 0.94 | 0.86 | 0.74 | 0.56 | 0.26 | 0.13 | 0.076 |
| Aniline Point, °F. | 160.0 | — | 161.5 | 159.7 | 157.5 | 156.0 | 154.5 | 141.5 |
| Aromatics, vol % | 31.1 | 29.4 | 29.1 | 31.0 | 31.5 | 33.0 | 32.3 | 38.0 |
| Naphthalenes, vol % | 8.5 | — | 8.0 | 7.7 | 7.1 | 6.2 | 6.7 | 11.3 |
| Boiling Range, °F., (D-2887) | | | | | | | | |
| 1% | 263 | — | 268 | 281 | 259 | 210 | 228 | 250 |
| 2 | 316 | — | 321 | 323 | 306 | 300 | 270 | 291 |
| 5 | 381 | — | 387 | 379 | 374 | 344 | 339 | 349 |
| 10 | 426 | — | 430 | 423 | 420 | 402 | 400 | 397 |
| 30 | 506 | — | 508 | 502 | 494 | 485 | 485 | 480 |
| 50 | 559 | — | 560 | 554 | 543 | 536 | 535 | 529 |
| 70 | 608 | — | 610 | 605 | 596 | 589 | 588 | 583 |
| 90 | 675 | — | 679 | 674 | 663 | 656 | 657 | 654 |
| 95 | 703 | — | 709 | 701 | 691 | 685 | 686 | 688 |
| 98 | 731 | — | 741 | 729 | 718 | 713 | 718 | 727 |

EXAMPLES 1-7

The Examples which follow a light Arab gas oil (LAGO) boiling at about 330° F. to 750° F. was processed over a 0.5 weight percent platinum on ZSM-22 which had been prepared by impregnating ZSM-22 with chloroplatinic acid to the desired weight level followed by drying, calcination in air for 3 hours at 900°

As can be seen from Table 1, Examples 1, 2, 3 and 4 simply did not produce a material having a sufficiently pour point. On the other hand, in Example 7 the temperature was simply too high since even though a product having a very desirable freeze point was obtained, the aromatic content of the product was simply unacceptable.

The data obtained in Table 1 is plotted in FIG. 1 and shows pour point and freeze points depending upon operating temperature.

EXAMPLE 8-10

The product obtained from Example 6 and the product obtained from Example 7 were blended with a standard jet fuel which had the following properties:

| | |
|---|---|
| Gravity, °API | 42.1 |
| Specific | 0.8149 |
| Pour Point, °F. | −60 |
| Freeze Point, °F. | −53 |
| Hydrogen, wt percent | 13.63 |
| Sulfur, wt percent | 0.08 |
| Aromatics, vol percent | 19.7 |
| Naphthalenes, vol percent | 2.4 |
| Smoke Point | 20.2 |
| Boiling Range, °F. | |
| 1 percent | 242 |
| 2 percent | 271 |
| 5 percent | 304 |
| 10 percent | 328 |
| 30 percent | 381 |
| 50 percent | 419 |
| 70 percent | 485 |
| 90 percent | 506 |
| 95 percent | 528 |
| 98 percent | 575 |

At a 1:1 (Example 8) and a 2:1 (Example 9) volume blend of the above stock was made with the 330° F. plus product from Example 6 and a 1:1 volume blend (Example 10) of the above was made with the 330° F. plus product from Example 7. The results are shown on the following Table.

| EXAMPLE | 8 | 9 | 10 |
|---|---|---|---|
| Mobil Jet A, vols | 1 | 2 | 1 |
| 330° F. Product, Run Temp., °F. | 750 | 750 | 800 |
| Volumes | 1 | 1 | 1 |
| Blend Properties | | | |
| Gravity, °API | 40.6 | 40.8 | 39.4 |
| Specific | 0.8222 | 0.8212 | 0.8280 |
| Pour Point, °F. | −55 | −65 | −65 |
| Freeze Point, °F. | −38 | −44 | −54 |
| Sulfur, wt percent[1] | 0.10 | 0.10 | 0.08 |
| Aromatics, vol percent[1] | 26.0 | 25.8 | 28.8 |
| Naphthalenes, vol %[1] | 4.5 | 3.8 | 6.8 |
| Smoke Point, minimum* | 19.5 | 19.5 | 16.5 |
| Boiling Range, °F. | | | |
| 1 percent | 194[2] | 195[2] | 270 |
| 2 percent | 245 | 247 | 290 |
| 5 percent | 306 | 302 | 321 |
| 10 percent | 342 | 336 | 345 |
| 30 percent | 415 | 399 | 415 |
| 50 percent | 473 | 450 | 469 |
| 70 percent | 528 | 501 | 519 |
| 90 percent | 629 | 602 | 615 |
| 95 percent | 670 | 650 | 654 |
| 98 percent | 712 | 699 | 695 |

[1]Calculated from analysis of two components.
[2]Values appear low compared to those of two components - no sample left for check analysis.
*Minimum 19.0

As can be seen, the 1:1 blend with the product from Example 7 simply had an unacceptable smoke point due to the fact that its aromatic content was too high.

What is claimed is:

1. A process for the production of jet fuel having an extended end point of up to 750° F. and low pour point and freeze point, which comprises:
    contacting a hydrocarbon feedstock having a boiling range of 330° to 750° F., a pour point and a freeze point and aromatic content above that of the jet fuel with a catalyst comprising zeolite ZSM-22 and a hydrogenation component in the presence of hydrogen at elevated pressure of 200 to 2000 psig and at a temperature high enough to reduce the freeze and pour points to jet fuel specification by shape selective dewaxing over the zeolite and which is low enough to reduce the aromatic content to jet fuel specification, to produce a dewaxed, hydrogenated jet fuel product of extended end point, low pour point and freeze point and reduced aromatic content.

2. A process according to claim 1 in which the temperature is from 725° to 775° F.

3. A process according to claim 1 in which the hydrogenation component is platinum.

4. A process according to claim 1 in which the aromatic content of the feed is reduced to a level such that the jet fuel product has a smoke point of at least 19 mm.

5. A process according to claim 4 in which the jet fuel product is blended with a jet fuel having an end point below 600° F. to produce a jet fuel blend of extended end point above 600° and up to 750° and a smoke point of at least 19 mm.

* * * * *